United States Patent Office 3,462,355
Patented Aug. 19, 1969

3,462,355
POLYMERIZATION PROCESS
Russell K. Griffith, Chagrin Falls, Ohio, assignor to The Standard Oil Company, Cleveland, Ohio, a corporation of Ohio
No Drawing. Filed Aug. 7, 1967, Ser. No. 658,615
Int. Cl. C08f 1/16, 27/02
U.S. Cl. 204—159.23                                     2 Claims

ABSTRACT OF THE DISCLOSURE

Resinous high polymers which may contain halogen are prepared by the polymerization of at least one polymerizable vinyl monomer using a combination of a halogen and light as the polymerization initiator.

---

This invention relates to a process for the manufacture of synthetic polymers and more particularly pertains to the manufacture of synthetic polymers which may contain halogen by the polymerization of one or more polymerizable vinyl monomers in the presence of molecular halogen and light.

The polymers produced by the process of the present invention are resinous high polymers and are to be distinguished in this respect from soft and sometimes liquid dimers, trimers and lower telomeric products such as those described in Journal of Organic Chemistry, vol. 26, 2324–2327 (1961) and vol. 31, 1094–1098 (1966).

The polymers of this invention are prepared in the substantial absence of oxygen and with ultraviolet radiation in the presence of certain controlled amounts of molecular halogen. The process of the present invention involves the addition polymerization of one or more vinyl monomers in the presence of molecular halogen and light and in the absence of any commonly used polymerization initiator. The control of the amount of halogen is a critical part of the process of this invention and is responsibe for the production of resinous high polymers rather than the dimers, trimers and other very low molecular weight products described previously. The molecular weight of the polymers produced by the instant process can be controlled by controlling the addition of halogen and thus voids the use of malodorous mercaptans and other types of chain transfer agents commonly used in vinyl addition polymerizations. Although some halogen addition to the polymer usually occurs in the instant process, the amount of halogen in the final polymeric product can be controlled from as little as 0.001% up to the maximum substitution theoretically possible for a given polymer.

The polymerizable vinyl monomers which can be polymerized alone or in combination include alpha, beta-monoolefinically unsaturated nitriles such as acrylonitrile, methacrylonitrile, crotononitrile, vinylidene cyanide and the like; alpha, beta-olefinically unsaturated carboxylic acids and anhydrides thereof such as acrylic acid, maleic acid, itaconic acid, citraconic acid, aconitic acid and the like; vinyl amides such as acrylamide, methacrylamide, N-methyl acrylamide, N,N-diethyl acrylamide, N-phenyl acrylamide, N-methylol acrylamide, N-methyl methacrylamide, p-vinyl benzamide, N-vinyl pyrrolidone and the like; vinyl aromatic compounds such as styrene, alpha-methyl styrene, the vinyl toluenes, vinyl naphthalene and the like; vinyl halides such as vinyl chloride, vinyl bromide, vinyl fluoride, vinylidene chloride, chlorotrifluoroethylene, 1,2-dichloroethylene, dichlorodifluoroethylene, tetrafluoroethylene and the like; vinyl esters such as vinyl acetate, vinyl propionate, vinyl butyrate, vinyl benzoate, vinyl laurate, isopropenyl acetate, isopropenyl caproate and the like; acrylic esters such as methyl acrylate, ethyl acrylate, propyl acrylates, butyl acrylates, amyl acrylates, hexyl acrylates, cyclohexyl acrylate, phenyl acrylate, octyl acrylates, dodecyl acrylates, benzyl acrylate and the like; the methacrylate esters such as methyl methacrylate, ethyl methacrylate, propyl methacrylates, butyl methacrylates, amyl methacrylates, hexyl methacrylates, cyclohexyl methacrylate, phenyl methacrylates, benzyl methacrylates, heptyl methacrylates, octyl methacrylates, nonyl methacrylates, decyl methacrylates, dodecyl methacrylates and the like; the maleate and fumarate esters such as diethyl maleate, the dipropyl maleates, the dibutyl maleates, the diamyl maleates, the dihexyl maleates, the dioctyl maleates, the dilauryl maleates, dimethyl fumarate, diethyl fumarate, the dipropyl fumarates, the dibutyl fumarates, the diheptyl fumarates, the dioctyl fumarates, dicyclohexyl fumarate, diphenyl fumarate, dilauryl fumarate and the like; vinyl ethers such as methyl vinyl ether, ethyl vinyl ether, propyl vinyl ethers, butyl vinyl ethers, amyl vinyl ethers, hexyl vinyl ethers, cyclohexyl vinyl ether, phenyl vinyl ether, benzyl vinyl ether and the like; allyl esters such as allyl acetate, allyl propionate, allyl laurate, allyl benzoate, methallyl acetate, methallyl propionate and the like; allyl ethers such as allyl methyl ether and the like; monoolefins such as ethylene, propylene, butylenes, amylenes, hexylenes, cyclohexene and the like; vinyl amines such as the vinyl pyridines and others; conjugated dienes such as butadiene-1,3, isoprene, piperylene, 2,3-dimethyl butadiene, 2-ethyl butadiene, hexadiene-1,3, 4-methyl-1,3-pentadiene, chloroprene, bromoprene, fluoroprene and the like; polyalkenyl monomers containing at least two $CH_2=C<$ groups per molecule separated by at least one other group such as allyl acrylate, allyl methacrylate, diallyl maleate, diallyl fumarate, ethylene glycol dimaleate, diallyl itaconate, methallyl acrylate, divinyl ether, diallyl ether, dimethallyl ether, ethylene glycol dimethacrylate, 1,1,1-trimethoxypropanedimethacrylate, glyceryl triacrylate, sucrose hexaacrylate, diallyl phthalate, triallyl cyanurate, 2,2,5,5-tetramethyl - 1,5 - hexadiene, 1,5-hexadiene, 1,6-heptadiene, 1,7-octadiene, 1,8-nonadiene divinyl biphenyl, divinyl naphthalene, divinyl benzene, trivinyl benzene, diallyl benzene, diisopropenyl benzene, allyl alloxyacetate, ethylidene dimethacrylate, methylene dimethacrylate, diallyl melamine, diallyl isomelamine, triallyl melamine, triallyl aconitate, triallyl phosphate, tetraallyl silane, tetravinyl silane, diallyl vinyl silane, tetraallyl germane, tetravinyl tin, tetravinyl germane, triacryloyl perhydrotriazine, trimethacryloyl perhydrotriazine, divinyl spirobi, methylene-bis-acrylamide, ethylene diacrylamide, N-allyl acrylamide, N,N-diallyl acrylamide, N,N-dimethallyl methacrylamide, polyallyl ethers of polyhydric alcohols such as tetraallyl pentaerythritol, hexaallyl sucrose, hexaallyl inositol, hexaallyl sorbitol, hexavinyl sucrose and the like and other types more fully disclosed in U.S. Patents Nos. 3,050,496; 2,991,276; 2,978,421; 2,716,418; 2,783,212; 2,712,004; 2,550,652; 2,475,846; 2,437,508; 2,341,334 and 2,273,891 and Canadian Patent No. 651,-654. In fact, the process described is relevant to all monomers capable of undergoing free radical polymerization or copolymerization.

The light employed in this invention can be any light source but preferably is a light source having some light in the ultraviolet range.

The halogen employed in the process of the present invention can be one or more of chlorine, bromine, iodine or fluorine. More preferred are chlorine and bromine and most preferred for the purpose of the present invention is chlorine.

The use of a controlled amount of halogen in the polymerization process of this invention is necessary. The amount of halogen can be expressed in terms of total moles of vinyl monomer component per mole of halogen used in the polymerization and can also be expressed in terms of total moles of vinyl monomer component employed in the polymerization reaction in relation to the moles of halogen added in any one hour period of the polymerization reaction. It is preferred in the instant process that there be used for the entire polymerization reaction a molar ratio of total vinyl monomer component to total molecular halogen of at least about 1 and that when the halogen is added the rate is always such that there is present at any time during the polymerization reaction at least a molar ratio of total vinyl monomer component employed in the polymerization to halogen of 15:1 per hour.

The process of this invention is further illustrated in the following examples wherein the amounts of ingredients and products are expressed in parts by weight unless otherwise indicated.

EXAMPLE A

All of the polymers described in the following examples were prepared by a general polymerization procedure. The reactor was a 2 liter Pyrex flask equipped with a mechanical stirrer, quartz immersion finger, halogen inlet and outlet and with gaseous monomers, two inlet bubbling tubes were used. The reaction temperature was usually 40° C. and a thorough nitrogen purge was effected prior to the introduction of the halogen to the polymerization mixture. The reaction times were those specified in each example and unless otherwise specified 100 watt ultraviolet irradiation was provided by a Hanovia high pressure, quartz mercury-vapor lamp. The use of the quartz immersion finger in the reactor when chlorine initiator is used is optional because chlorine activation light wave length is 3330 A. and Pyrex glass will transmit more than 80% of the radiation at this wave length. A low pressure mercury lamp can also be used although it gives a banded spectrum of light.

The polymerization reaction can be conducted in solution, suspension, emulsion or in bulk. The flow of halogen can be varied within certain limits to yield high molecular weight polymer with low halogen content (low halogen addition rate), or lower molecular weight polymer with higher halogen content (higher halogen addition rate), or high molecular weight, higher halogen content polymer (low initial halogen, low halogen during polymerization and high final halogen addition rate after polymerization is completed).

The resinous high polymers produced by the process of this invention have improved flame resistance because of their increased halogen content and thus are useful for making molded articles, films, fibers and the like.

EXAMPLE I

The reactor described in Example A was charged with 844 parts (1700 mls.) of distilled water. Stirring was commenced, and 100 parts (201.5 grams, 250 mls.) of twice distilled acrylonitrile monomer were added. The temperature of the reaction mixture was brought to 40° C. and was purged with gaseous nitrogen for about five minutes. The ultraviolet irradiation was started and continued during the reaction period of six hours. Gaseous chlorine was bubbled through the polymerization mixture at a rate of 2.47 parts by weight per hour (14.8 parts in six hours, 29.5 cc. per minute, at 40° C.) for an initial molar acrylonitrile/Cl$_2$/hour ratio of 48. At the end of the reaction period the solid, white polyacrylonitrile precipitate was isolated by vacuum filtration and dried. The dried polymer (33.4 parts) recovered had an intrinsic viscosity in dimethyl formamide at 25° C. of 0.079 (M.W.=2,400) and was found to contain 15.3% by weight of chlorine.

EXAMPLE II

A repeat of Example I procedure in the absence of chlorine resulted in the formation of 0.52 part of insoluble, ultraviolet degraded (dark, appeared burned) polyacrylonitrile adhering to the immersion tube.

EXAMPLE III

Example I was repeated with the exception that 18.3 parts of bromine were added initially to the polymerization mixture in place of chlorine which represents an initial moles acrylonitrile/Br$_2$/hour ratio of 16.5. 25.8 parts of a brominated polyacrylonitrile were obtained containing 31% by weight of bromine and having an intrinsic viscosity of 3.1 at 25° C. in dimethyl formamide (M.W.=240,000).

EXAMPLE IV

Example I was repeated several times employing the monomers and conditions specified in Table I, and the results specified in Table I were obtained.

TABLE I

| Monomer [1] | Parts | Water (parts) | Time (hours) | Yield (parts) | Cl$_2$ (parts/hr.) | Intrinsic viscosity | Percent chlorine in polymer | Molecular weight | Solvent | Ratio [2] |
|---|---|---|---|---|---|---|---|---|---|---|
| Methacrylonitrile | 100 | 850 | 23 | 17.85 | 1.86 | 0.04 | 15.4 | 3,600 | Dimethyl formamide. | 56.9 |
| Methyl methacrylate | 100 | 723 | 6 | 22.2 | 1.72 | 0.44 | 3.2 | 320,000 | Ethylacetate. | 41 |
| Styrene | 100 | 750 | 6 | 1.1 | 1.93 | insol. | 2.9 | | Toluene. | 35.3 |
| Vinyl Acetate | 100 | 730 | 6 | 20.4 | 1.81 | 0.50 | 1.6 | 50,000 | Ethylacetate. | 45 |

[1] All temperatures 40° C.; all monomers distilled, 100 watt ultraviolet source in quartz immersion tube.
[2] Ratio moles total monomer employed in polymerization/moles Cl$_2$/hour.

EXAMPLE V

Polyvinyl chloride containing 59.2% chlorine was prepared by the procedure of Example IV.

EXAMPLE VI 100 parts acrylonitrile, 600 parts water and 0.5 part polyvinyl pyrrolidone were charged to a Pyrex reactor at 40° C., flushed with nitrogen then irradiated with the light from an external 8 watt germicidal lamp. Chlorine was bubbled through the reaction mixture at a rate of 0.095 part/hour (initial mole monomer/mole Cl$_2$/hour ratio of 1410) for five hours. The polymer obtained (11.8 parts) had a weight average molecular weight of 230,000 as measured by gel permeation chromatography of a dimethyl formamide solution. The polymer contained 1.9% chlorine.

EXAMPLE VII 100 parts of distilled acrylonitrile were charged to a quartz reactor and maintained at 40° C. After flushing the system with bubbling nitrogen, the reactor was irradiated with an 8 watt germicidal mercury lamp and chlorine was passed through the acrylonitrile at a rate of 1.19 parts/hour or an initial moles monomer/mole chlorine/hour ratio of 112.5. A white precipitate formed immediately. The reaction was stopped after 95 minutes due to the thick precipitate that had formed. The polyacrylonitrile was found to have an intrinsic viscosity in dimethyl formamide at 25° C. of 5.3 deciliters/gram, corresponding to a molecular weight of 470,000.

EXAMPLE VIII 725 parts of carbon tetrachloride and 100 parts of distilled acrylonitrile were charged to a Pyrex reactor at 40° C. and flushed with nitrogen. 145 parts of chlorine-saturated carbon tetrachloride were then added under external illumination from an 8 watt germicidal mercury lamp (mole ratio of total acrylonitrile/chlorine/hour of 228). A nitrogen atmosphere was maintained throughout the reaction period of 23 hours. The polyacrylonitrile precipitate was isolated by filtration and vacuum dried. The polymer (1.7 parts) contained 6% chlorine and had a weight average molecular weight of 11,360 as determined by gel permeation chromatography in dimethyl formamide.

EXAMPLE IX 745 parts of distilled water were saturated with 2.45 parts chlorine at 60° C., flushed with nitrogen to remove undissolved chlorine, then treated with 100 parts of distilled acrylonitrile under the effect of a 20 watt low pressure mercury lamp contained in a quartz immersion tube. Within 20 minutes a heavy polymer coating had formed. The molar ratio of acrylonitrile/$Cl_2$ hour was 54.6. The reaction was stopped after 15 hours, 45 minutes, and the polymer collected by filtration. The polyacrylonitrile (27.3) parts was found to contain 1.7% chlorine and had an intrinsic viscosity in dimethyl formamide at 25° C. of 4.34 corresponding to a molecular weight of 362,400.

When conducting the polymerization by acrylonitrile addition to a chlorine-saturated solvent, water or other solvents may be used with or without added salts or acids to moderate the chlorine solubility.

EXAMPLE X 100 parts of distilled styrene, 133 parts of distilled acrylonitrile and 1870 parts of distilled water were charged to a Pyrex reactor at 60° C. The system was purged with nitrogen, then treated with chlorine bubbling at a rate of 0.104 part/minute (molar ratio of total monomers/chlorine/hour of 39.9) and external ultraviolet irradiation from a 100 watt, high pressure, mercury arc lamp. After six hours the reaction was stopped and the polymer was coagulated in methanol. 20.7 parts of polymer were obtained having an intrinsic viscosity in dimethyl formamide at 25° C. of 0.70 deciliter/gram. The polymer contained 6.0% chlorine. Nuclear magnetic resonance indicated that the material is a copolymer and not a mixture of homopolymers, containing about 65 mole percent styrene and 35 mole percent acrylonitrile.

EXAMPLE XI 100 parts of distilled isoprene were suspended in 1000 parts of distilled water at 23° C. under a nitrogen atmosphere. The stirred reaction mixture was irradiated with an external 100 watt, high pressure, mercury vapor lamp while chlorine was bubbled through the liquid at a ratio of moles monomer/mole chlorine/hour of 31.7. The reaction was stopped after seven hours and the lower organic liquid phase treated with methanol, yielding a small amount of polymer. The polyisoprene was identified by infrared analysis.

I claim:
1. A process for the addition polymerization to a resinous high polymer of a polymerizable vinyl monomer component selected from the group consisting of acrylonitrile, methacrylonitrile, methyl methacrylate, styrene, vinyl acetate, vinyl chloride, and isoprene, comprising subjecting said vinyl monomer component at a temperature of from about —70° C. to about 100° C. to the combination of molecular halogen and light wherein the halogen is added at such a rate during the reaction period that there is present at any time during the polymerization reaction a molar ratio of total vinyl component to halogen of at least 15:1, and recovering polymer from the reaction medium in which medium the molar ratio of vinyl component to halogen is 1:1.

2. The process of claim 1 wherein the halogen is chlorine.

References Cited

Catalytic, Photochemical, Electrolytic Reactions, Komarewsky et al., Technique of Organic Chemistry, vol. II, Interscience, 1956, pp. 359–365.

Delzenne, Les Sensibilisateurs de Photopolymerization Industrie Chimique Belge, vol. 24, No. 7 (1959), pp. 753–754.

Kosar, Light Sensitive Systems, Wiley and Sons (1965), pp. 180–183.

MURRAY TILLMAN, Primary Examiner

R. B. TURER, Assistant Examiner

U.S. Cl. X.R.

260—88.7, 89.1, 89.5, 92.8, 93.5, 94.2